Feb. 27, 1962 R. A. POTRUCH 3,022,701
PLASTIC ANCHOR-TYPE FASTENER AND DRIVER
MEANS FOR EXPANDING SAME
Filed Aug. 10, 1959
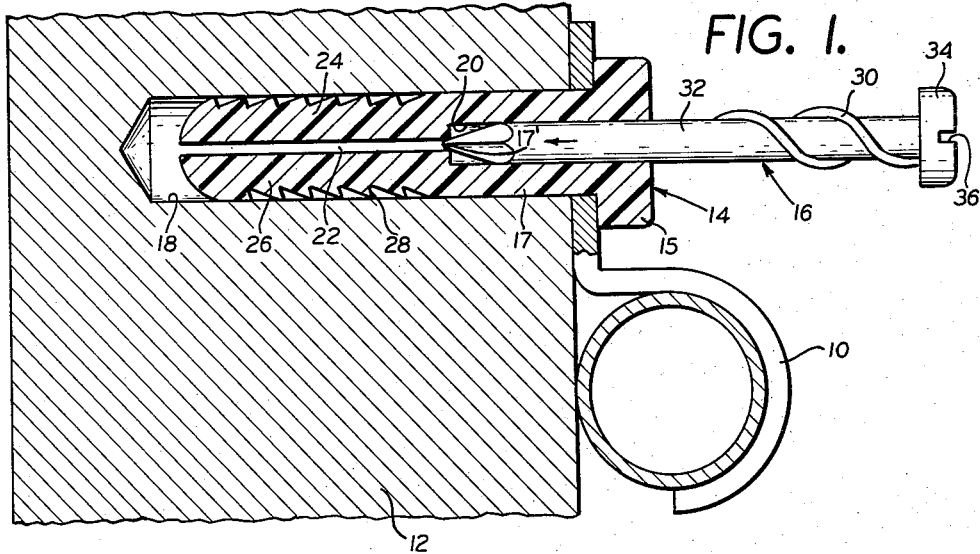
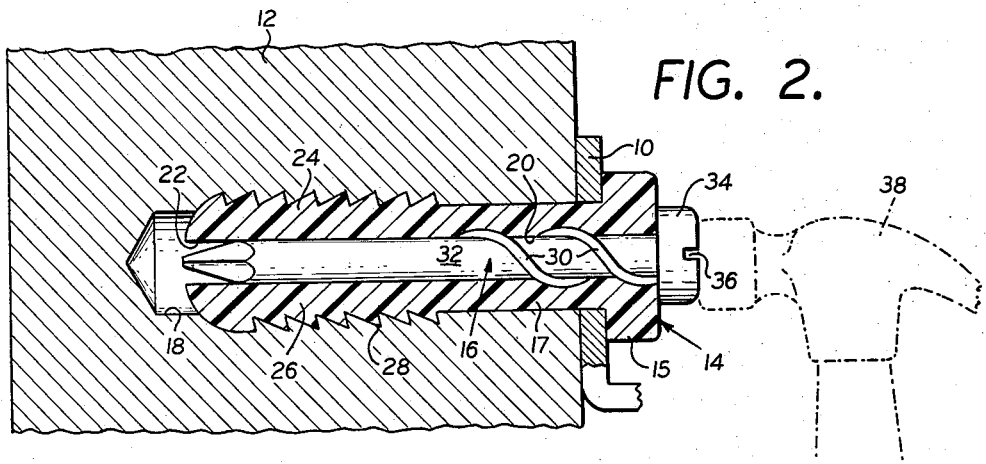
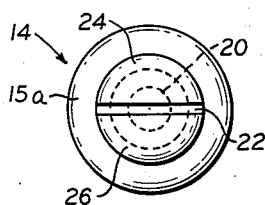
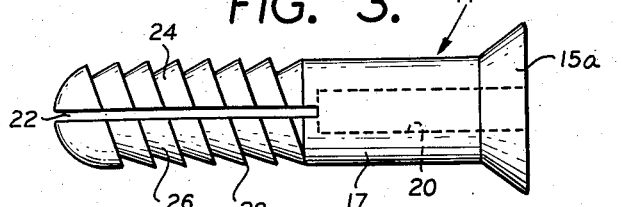
INVENTOR
ROBERT A. POTRUCH
BY
ATTORNEY.

3,022,701
PLASTIC ANCHOR-TYPE FASTENER AND DRIVER
MEANS FOR EXPANDING SAME
Robert A. Potruch, Miami Beach, Fla., assignor, by mesne assignments, to U.S. Expansion Bolt Company, York, Pa.
Filed Aug. 10, 1959, Ser. No. 832,759
4 Claims. (Cl. 85—2.4)

This invention relates to wall fasteners and more particularly, to a fastener which provides its own mounting or anchorage.

The wall fasteners of the present invention are intended for applications where conventional fasteners such as screws and nails cannot be utilized because of the composition and physical characteristics of the material in which it is desired to anchor the same. Amongst such materials are concrete, cinder block, brick, plaster, stone, marble, composition board and others.

For such applications it has heretofore been proposed to provide the fastener with its own anchorage or mounting. Such proposals have included a wall insert having a longitudinal slot extending from one end thereof defining two flexible insert members adapted to be spaced apart to thereby anchor the insert within a bore made for that purpose upon the introduction of a nail or a screw within the slot.

The conventional anchor type fastener is not completely satisfactory, however, in that in many instances such an anchor will not securely grip the bore in which it is inserted; is adversely affected by environmental conditions and thereby subject to rust, corrosion and other forms of deterioration; is difficult to unfasten; and the anchor therefor cannot be readily withdrawn and reused.

It is among the primary objects of the present invention to provide a new and improved anchor type fastener in which the wedging element may quickly and securely be driven into place by means of a hammer and may subsequently be removed easily and quickly by screw driver means.

It is another important object of the present invention to provide an anchor type fastener wherein the wedging means may be inserted into and withdrawn from the anchor without damage to the anchor.

It is still a further object of the present invention to provide an anchor type fastener wherein the anchor itself may readily be withdrawn from its bore upon removal of the wedging means.

It is yet a further object of the present invention to provide an anchor type fastener which will not rust or corrode or otherwise deteriorate due to environmental conditions.

A fuller understanding of the invention and the manner in which its objectives and advantages may be realized will become apparent from the following detailed description thereof taken in connection with the accompanying drawing wherein:

FIG. 1 is a longitudinal sectional view of an anchor type fastener in accordance with the present invention shown just prior to the final mounting thereof;

FIG. 2 is a longitudinal sectional view of an anchor type fastener in accordance with the present invention shown just after the final mounting thereof;

FIG. 3 is a side elevation of an anchor or insert in accordance with the present invention; and FIG. 4 is an end view thereof.

Referring now to the drawing, an anchor type fastener in accordance with the present invention is shown holding bracket 10 on cinder block wall 12 or the like, made of a composition which characteristically cannot hold a conventional screw or nail. In using the term "wall" in connection with inserts and fasteners in accordance with the present invention, it is meant to cover those bodies presenting a mounting surface capable of receiving an anchor type fastener.

The fastener in this instance basically consists of a wall insert or anchor 14 and fastening and wedging means, in this instance nail 16 of special construction shortly to be described.

Prior to the mounting operation, a bore 18 must be made in wall 12. This may be accomplished by a high velocity electric drill or any other suitable means.

As may be seen in the drawing, insert 14 is generally cylindrical in shape with a head 15 (or 15a) at one end and a cylindrical shank 17 adjacent said head, and a longitudinal passage 20 formed in said head and shank. A longitudinal slot 22 extending from the other end of the insert to its said shank defines two resiliently flexible insert legs 24 and 26. Slot 22 and passage 20 are aligned and in communication with one another.

Insert legs 24 and 26 are both provided with a non-slip outer surface which, in the embodiment shown in the drawing, is formed by a series of curved ridges or threads 28, each presenting a sharp edge for biting and gripping purposes, as will hereinafter become apparent.

It may be thus seen that when a fastening and wedging means such as nail 16 is driven through passage 20 into slot 22, it will, by reason of the relative dimensions of the respective members, cause insert legs 24 and 26 to be wedged and spread apart into tight frictional engagement with the wall of bore 18, as shown in FIG. 2, thereby exerting a powerful and continuous gripping force on said wall. Pointed tip 17' is formed at the lead end of the nail for wedging entry into slot 22. A head 34 is formed at the opposite end of the nail, as hereinafter more fully described. Ridges or threads 28 will bite into the bore wall under such wedging action of nail 16 and will materially aid in holding the insert within the bore.

It has been found to be of great advantage to provide nail 16 with a relatively shallow helical thread (or threads) 30 to facilitate its removal from the insert. Thread 30 is formed on that portion of cylindrical shank 32 of the nail which is situated adjacent nail head 34. The threaded portion of the shank corresponds to bore 20 in length and the outer diameter of the thread slightly exceeds the diameter of the bore. A slot 36, adapted for engagement with a screw driver, is formed in head 34. Thus, although the nail may be driven into the insert by a hammer 38, it may be removed from said insert by a screw driver.

It has additionally been found that if the insert is formed of a material having relatively resilient as well as flexible characteristics, the insert itself may readily be removed from the bore without damage. This is because insert legs 24 and 26, if resilient, will tend to retract when the nail is removed from the slot and tend to assume their original positions clear of the bore wall. When this occurs, the insert legs lose their grip on the bore wall.

Nylon has been found to be ideal for the insert material although other materials may also be used. If the material forming the insert is relatively resilient, as is the case with nylon, and has the cold flow and memory properties and characteristics of nylon, transitory thread grooves will be formed on the wall of passage 20 complementary to and mating with the screw threads 30 on shank 32 of nail 16. This is especially true when threading 30 is formed without sharp cutting edges which would permanently mar the wall of passage 20 by reaming action and prevent normal reuse of the insert.

It may be thus seen that by reason of the present invention, a new and improved anchor-type fastener has been provided which will securely grip the wall of the bore wherein it is inserted. Moreover, an anchor-type fastener has been provided wherein both the ultimate fastening means (the nail) and the anchor therefor may readily be removed from their respective mountings. Furthermore, a fastener in accordance with the present invention is strong, secure and highly resistant to deterioration by reason of prolonged exposure to the elements.

Although the invention has been described in detail with respect to one preferred embodiment thereof, it will be understood by those skilled in the art, after reading this specification, that various changes and modifications may be made without departing from the spirit of the invention and the scope of the appended claims.

I claim:

1. A re-usable anchor-type fastener, comprising the combination of an expandable insert molded of synthetic resin having the general properties of nylon and hammer-driven means to expand said insert, said insert having a longitudinal hole formed therein at one end to receive said hammer-driven means, the opposite end of said insert being longitudinally slotted to form a plurality of outwardly flexible portions, said hammer-driven means comprising a headed nail having a substantially cylindrical shank with a pointed tip adapted for wedging entry between said outwardly flexible portions to force them radially outwardly upon being driven through said longitudinal hole and into said slotted end of the insert, said nail having smooth-crested screw-threads, wherein said smooth crest joins the thread faces by rounded edges, said screw threads being formed on said shank adjacent its head and terminating approximately midway of the length of the shank to engage the wall of the longitudinal hole in the insert without reaming action as the same is forced into said insert by a translatory movement and to form transitory threads therein complementary to said nail threads, said head being also formed with means adapted to be engaged by a tool to rotate said nail to cause retrograde movement thereof and removal from the insert.

2. A re-usable anchor-type fastener in accordance with claim 1, wherein the slotted end of the expandable insert is provided with a single pair of outwardly flexible portions separated by a single longitudinal slot which is in alignment and communication with said longitudinal hole, the width of said longitudinal slot being smaller than the diameter of the shank of the nail, whereby said pair of outwardly flexible portions are forced apart when the nail is driven between them.

3. A re-usable anchor-type fastener in accordance with claim 1, wherein said expandable insert is provided with a generally cylindrical outer configuration, a head being formed at the first-mentioned end thereof, said longitudinal hole extending through said head, said outwardly flexible portions formed at the opposite end of said expandable insert being provided with a non-slip outer surface.

4. A re-usable anchor-type fastener in accordance with claim 3, wherein the non-slip outer surface of the outwardly flexible portions of the expandable insert consists of a plurality of curved ridges presenting relatively sharp edges.

References Cited in the file of this patent

UNITED STATES PATENTS

| 83,699 | Dunn | Nov. 3, 1868 |
| 780,957 | Palmer | Jan. 24, 1905 |
| 1,274,923 | Meyner | Aug. 6, 1918 |
| 1,865,866 | Lee | July 5, 1932 |

FOREIGN PATENTS

| 212,836 | Switzerland | Mar. 17, 1941 |
| 857,142 | Germany | Oct. 2, 1952 |
| 530,042 | Italy | June 2, 1955 |
| 311,726 | Switzerland | Feb. 15, 1956 |
| 1,122,536 | France | Sept. 10, 1956 |